(12) United States Patent
Ramanath et al.

(10) Patent No.: US 7,933,270 B2
(45) Date of Patent: Apr. 26, 2011

(54) METHOD AND SYSTEM FOR PRIORITIZING IP TRAFFIC IN A WIRELESS NETWORK BASED ON A TYPE-OF-SERVICE IDENTIFIER

(75) Inventors: Rajeev Ramanath, Plano, TX (US); Nivedan Thadasina, Allen, TX (US); Rajasimann Vijayasimman, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 744 days.

(21) Appl. No.: 11/091,063

(22) Filed: Mar. 28, 2005

(65) Prior Publication Data

US 2005/0265335 A1    Dec. 1, 2005

Related U.S. Application Data

(60) Provisional application No. 60/575,585, filed on May 27, 2004.

(51) Int. Cl.
*H04L 12/28* (2006.01)
*H04L 12/56* (2006.01)
*H04J 3/24* (2006.01)

(52) U.S. Cl. .............. 370/392; 370/395.42; 370/474

(58) Field of Classification Search .......... 370/230, 370/235, 389, 392, 395.42, 395.52, 444, 370/455, 471, 474
See application file for complete search history.

(56) References Cited

U.S. PATENT DOCUMENTS

| | | | |
|---|---|---|---|
| 6,731,876 B1 * | 5/2004 | Okamoto et al. | 398/75 |
| 7,068,645 B1 * | 6/2006 | Phadnis et al. | 370/352 |
| 7,096,261 B2 * | 8/2006 | Abrol et al. | 709/223 |
| 7,191,231 B2 * | 3/2007 | Miernik et al. | 709/225 |
| 7,315,545 B1 * | 1/2008 | Chowdhury et al. | 370/395.4 |
| 2004/0107294 A1 * | 6/2004 | Chen | 709/236 |
| 2004/0158710 A1 * | 8/2004 | Buer et al. | 713/160 |

OTHER PUBLICATIONS

C. Perkins, RFC 2003—IP Encapsulation within IP, Oct. 1996, IBM, p. 3.*
Information Sciences Institute @ University of Souther California, RFC 791—Internet Protocol, Sep. 1981, p. 10.*

* cited by examiner

*Primary Examiner* — Chirag G Shah
*Assistant Examiner* — Ashley L Shivers

(57) ABSTRACT

A method for prioritizing IP traffic in a wireless network based on a type-of-service (TOS) identifier is provided. The method includes receiving an IP datagram. The IP datagram comprises an original TOS identifier. An IP message is formed by adding an IP header to the IP datagram. The original TOS identifier is copied from the IP datagram into a duplicate TOS identifier in the IP header.

20 Claims, 3 Drawing Sheets

METHOD AND SYSTEM FOR PRIORITIZING IP TRAFFIC IN A WIRELESS NETWORK BASED ON A TYPE-OF-SERVICE IDENTIFIER

CROSS-REFERENCE TO RELATED APPLICATION AND CLAIM OF PRIORITY

The present invention is related to the invention disclosed in U.S. Patent Application Ser. No. 60/575,585, entitled "IP TOS bit marking at the PDSN for priority handling of RAN messages," filed on May 27, 2004. Patent Application Ser. No. 60/575,585 is assigned to the assignee of the present application. The subject matter disclosed in Patent Application Ser. No. 60/575,585 is hereby incorporated by reference into the present disclosure as if fully set forth herein.

TECHNICAL FIELD OF THE INVENTION

The present invention is directed in general to wireless telecommunications networks and, more specifically, to an improved method and system for prioritizing IP traffic in a wireless network based on a type-of-service identifier.

BACKGROUND OF THE INVENTION

Many wireless applications use packet data service option 33 in a CDMA2000 network as a basic packet data transport over which user data may be transmitted. For some applications, the base station needs to be able to look at the contents of the user data in order to handle some packets differently for various reasons. However, the contents of the user data are not readily available at the base station because the user data is embedded inside the Point-to-Point protocol (PPP) header. Parsing through the PPP header to access the user data at the base station is computationally intensive and relatively complex.

Currently, in order to obtain a type-of-service bit, for example, the base station has to parse through an external IP header, a GRE header, a PPP header and the IP header. In order to do this, the base station has to incorporate complex algorithms to handle all possible PPP header and user data parameters, including various types of compression, because the base station has no knowledge of the negotiated parameters that were used in setting up the PPP session between the packet data server node (PDSN) and the mobile station.

Parsing the PPP frame and the IP datagram is a processor-intensive procedure because the base station has to parse every single octet that comes from the PDSN. In addition, detecting a PPP flag sequence is a CPU-intensive task, which is normally done using a hardware-assisted HDLC de-framer. Any errors in the bit stream or parsing would falsely trigger the wrong handling of the communication session by the base station, which would be detrimental to the call setup latency.

Furthermore, more processing at the base station means that time-critical, high-priority messages are delayed even more due to the additional processing. For example, a delay in detecting a high-priority message at the base station could result in a call state transition at the mobile station and the base station. This new call state could essentially make the message that was supposed to be received obsolete.

Therefore, there is a need in the art for an improved method for prioritizing IP traffic in a wireless network based on a type-of-service identifier. In particular, there is a need for an improved wireless network that reduces the amount of time needed to determine the type of service for a particular communication session.

SUMMARY OF THE INVENTION

In accordance with the present invention, an improved method and system for prioritizing IP traffic in a wireless network based on a type-of-service identifier are provided that substantially eliminate or reduce disadvantages and problems associated with conventional methods and systems.

According to one embodiment of the present invention, a method for prioritizing IP traffic in a wireless network based on a type-of-service (TOS) identifier is provided. According to an advantageous embodiment of the present invention, the method comprises the steps of: 1) receiving an IP datagram that comprises an original TOS identifier; 2) forming an IP message by adding an IP header to the IP datagram; and 3) copying the original TOS identifier from the IP datagram into a duplicate TOS identifier in the IP header.

According to one embodiment of the present invention, the step of forming the IP message further comprises adding a point-to-point protocol header and a point-to-point protocol trailer to the IP datagram.

According to another embodiment of the present invention, the step of forming the IP message further comprises adding a generic routing encapsulation header to the IP datagram.

According to still another embodiment of the present invention, the original TOS identifier and the duplicate TOS identifier each comprise a plurality of bits.

According to yet another embodiment of the present invention, the original TOS identifier and the duplicate TOS identifier each comprise a single bit, and the single bit is operable to be set to a one for a high priority IP datagram and set to a zero for a low priority IP datagram.

According to a further embodiment of the present invention, the method further comprises the step of sending the IP message to a packet control function unit.

According to a still further embodiment of the present invention, the method further comprises the step of prioritizing the IP datagram at the packet control function unit based on the duplicate TOS identifier.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
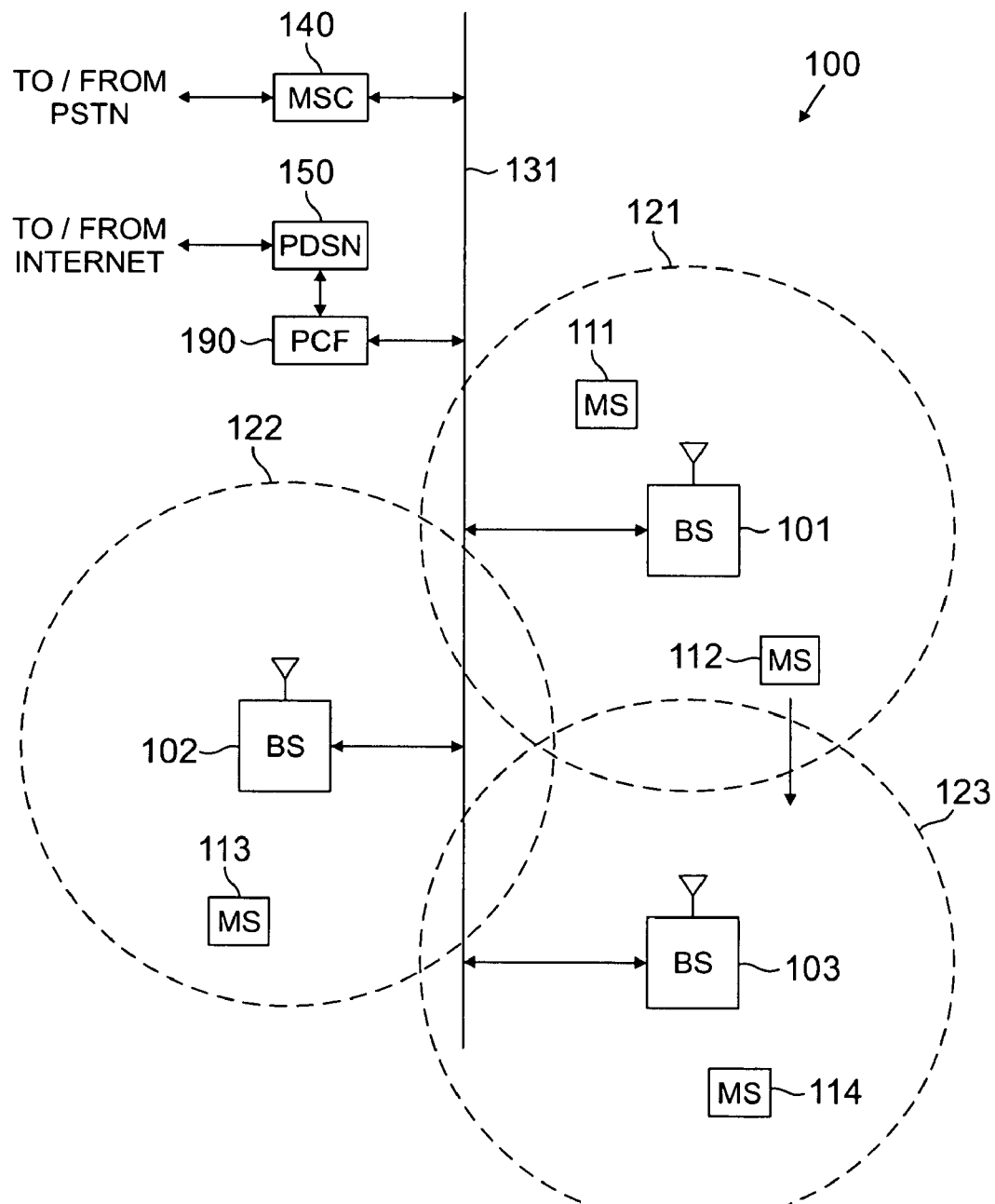
FIG. 1 illustrates an exemplary wireless network in which IP traffic may be prioritized based on a type-of-service identifier according to the principles of the present invention.

FIG. 1 illustrates exemplary wireless network 100, in which IP traffic may be prioritized based on a type-of-service identifier in accordance with principles of the present invention. Wireless network 100 comprises a plurality of cell sites 121-123, each containing one of the base stations, BS 101, BS 102, or BS 103. In the exemplary embodiment, base stations 101-103 communicate with a plurality of mobile stations (MS) 111-114 over code division multiple access (CDMA) channels according to, for example, the IS-2000 standard (i.e., CDMA2000). In alternate embodiments, base stations 101-103 may communicate with mobile stations 111-114 according to other standards, such as GSM, OFDMA, or the like. In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector.

The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, wireless network 100 is operable to prioritize IP traffic based on a type-of-service identifier. For the purposes of simplicity and clarity in explaining the operation of the present invention, it shall be assumed in the following example that base station (BS) 101 of wireless network 100 is in communication with PDSN 150, which is delivering IP datagrams to BS 101 by way of PCF unit 190. These IP datagrams may be received at PDSN 150 from a server (not shown) that is coupled to the Internet or to another suitable network capable of providing communication between PDSN 150 and the server. However, the descriptions that follow also apply to the remaining base stations in wireless network 100.

As described in more detail below, PDSN 150 may copy a type-of-service (TOS) identifier that is stored within each IP datagram into an IP header that is added to the IP datagram before PDSN 150 sends the IP datagram to PCF unit 190 for communication to BS 101. PCF unit 190 may then easily identify the type of service associated with the communication session for that IP datagram without having to parse through several headers added to the IP datagram by PDSN 150, as well as the IP datagram itself.

Figure 2:
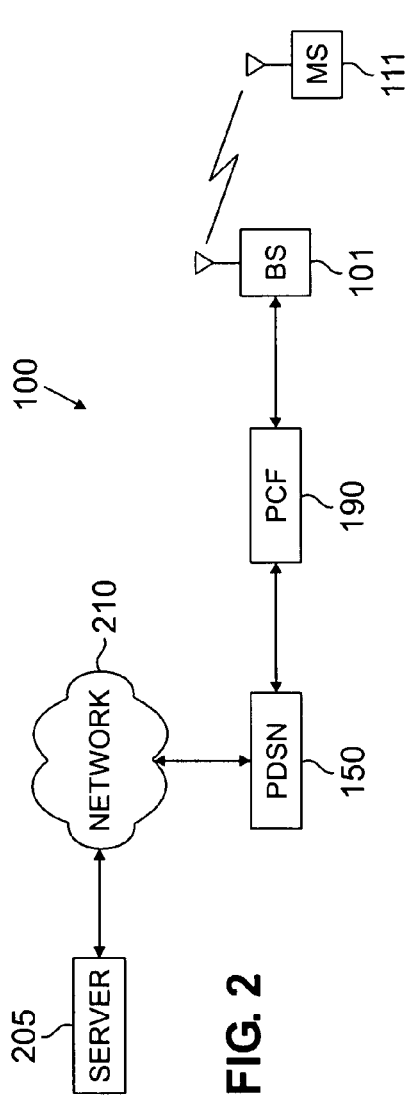
FIG. 2 illustrates a portion of the wireless network of FIG. 1 in greater detail according to the principles of the present invention.

FIG. 2 illustrates a portion of wireless network of 100 in greater detail according to the principles of the present invention. Base station (BS) 101 and mobile station (MS) 111 are illustrated by way of example only. However, the descriptions that follow also apply to the remaining base stations and mobile stations in wireless network 100.

For the illustrated embodiment, a server 205 is operable to send a plurality of IP packets, or datagrams, to MS 111 in a packet data session. The IP datagrams are sent from server 205 through a network 210, such as the Internet, to PDSN 150. PDSN 150 and MS 111 have a Point-to-Point protocol (PPP) connection established. IP traffic from the server 205 is carried over the PPP connection.

PDSN 150 packages the IP datagrams for delivery to PCF unit 190, with which PDSN 150 may communicate using an IP tunnel on an RP link. Thus, before sending the IP datagram to PCF unit 190, PDSN 150 adds GRE header and an IP header. PCF unit 190 removes the GRE header and the IP header added by the PDSN 150 before sending the user data to BS 101. BS 101 then sends the user data to MS 111.

Figure 3:
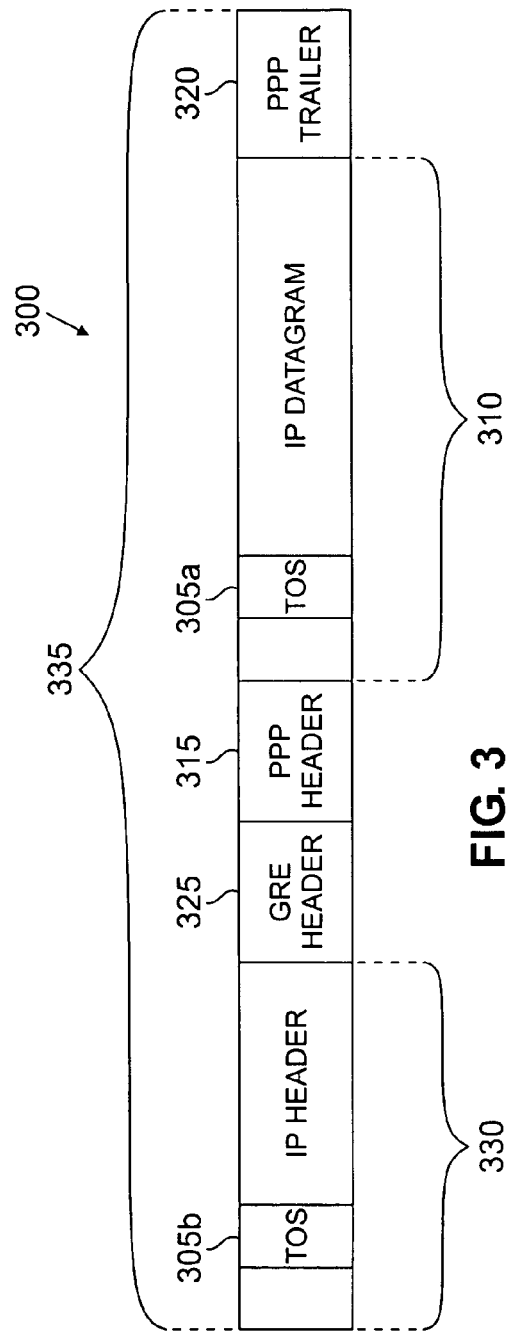
FIG. 3 illustrates a message format that is operable to allow the base station of FIGS. 1 and 2 to prioritize IP traffic based on a type-of-service identifier in accordance with one embodiment of the present invention.

FIG. 3 illustrates a message format 300 that is operable to allow BS 101 to prioritize IP traffic based on a type-of-service (TOS) identifier 305*a* in accordance with one embodiment of the present invention. The message format 300 comprises the IP datagram 310 originally sent by server 205 for MS 111. When PDSN 150 receives IP datagram 310, PDSN 150 adds a Point-to-Point protocol (PPP) header 315 and a PPP trailer 320 to IP datagram 310. PDSN 150 then adds a generic routing encapsulation (GRE) header 325 and an IP header 330 to IP datagram 310.

After PDSN 150 finishes adding data fields 315, 320, 325 and 330 to IP datagram 310, PDSN 150 copies an original TOS identifier 305*a* from IP datagram 310 to a duplicate TOS identifier 305*b* in IP header 330 to complete an IP message 335. PDSN 150 then sends IP message 335 to PCF unit 190. PCF unit 190 receives IP message 335 and checks duplicate TOS identifier 305*b* to determine how to prioritize IP datagram 310. PCF unit 190 also removes the additional data fields 315, 320, 325 and 330 before sending IP datagram 310 to BS 101 for delivery to MS 111.

According to one embodiment, TOS identifier 305 may comprise a single bit that may be set to one for high priority IP datagrams 310 and set to or left at zero for low priority IP datagrams 310. According to another embodiment, TOS identifier 305 may comprise a plurality of bits that may be used to indicate to which of a plurality of priorities IP datagram 310 belongs. However, it will be understood that TOS identifier 305 may comprise any suitable form without departing from the scope of the present invention.

For a particular embodiment in which TOS identifier 305 comprises a single bit and the bit is set to one for high priority IP datagrams 310 and left at zero for low priority IP datagrams 310, PDSN 150 may only copy original TOS identifier 305*a* when original TOS identifier 305*a* has a value of one. Thus, for this embodiment, duplicate TOS identifier 305*b* has a default value of zero and only needs to be changed when original TOS identifier 305*a* has a value of one. However, it will be understood that PDSN 150 may copy original TOS identifier 305*a* into duplicate TOS identifier 305*b* regardless of the value of original TOS identifier 305*a* without departing from the scope of the present invention.

When TOS identifier 305 indicates that IP datagram 310 is a high priority IP datagram 310, BS 101 may invoke a faster air interface message, such as short data burst or the like, in order to send time-critical messages to MS 111 more quickly. It will be understood that BS 101 may handle high priority IP datagrams 310 in any suitable manner without departing from the scope of the present invention.

Figure 4:
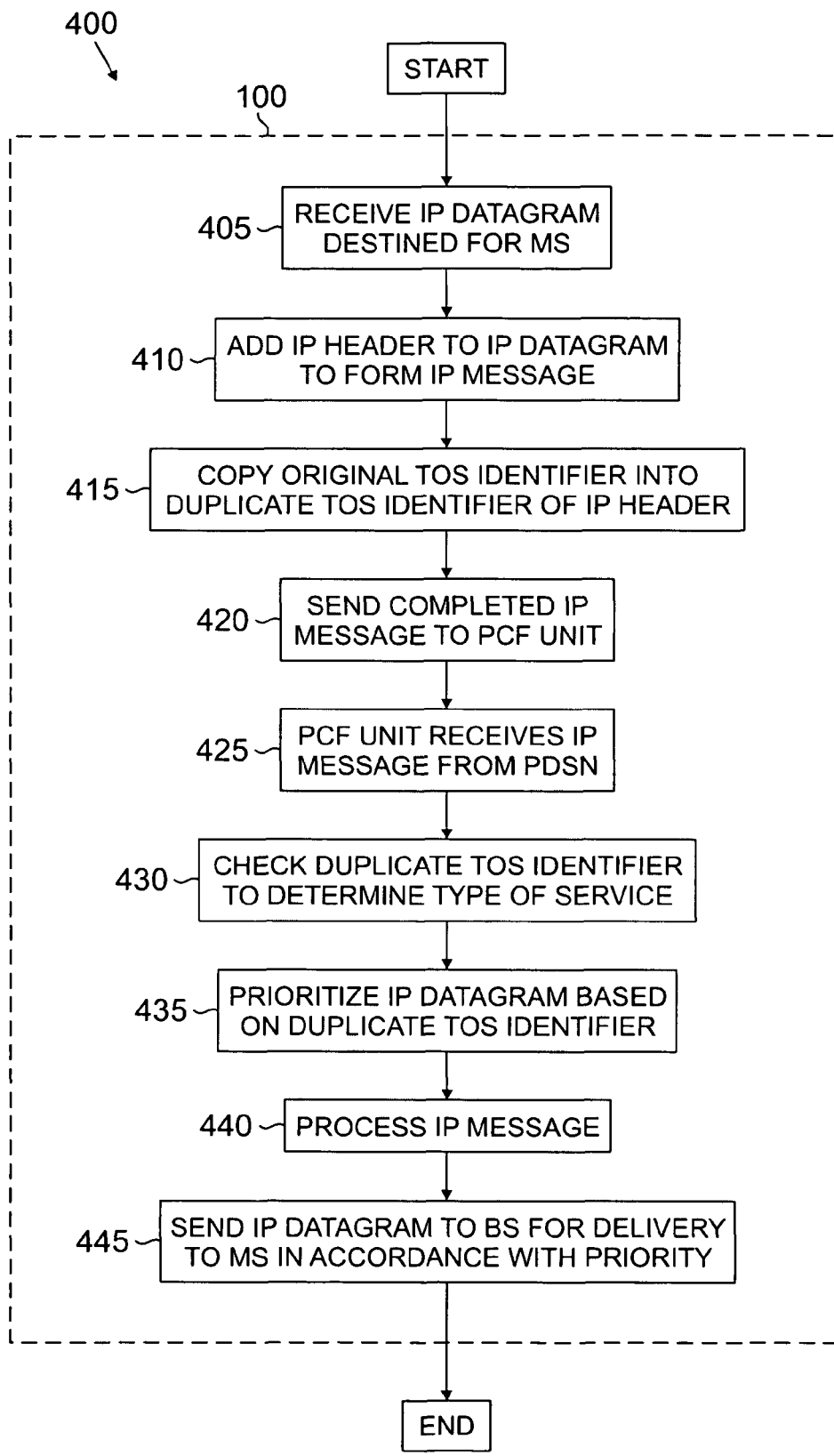
FIG. 4 is a flow diagram illustrating a method for prioritizing IP traffic in the wireless network of FIGS. 1 and 2 based on a type-of-service identifier in accordance with one embodiment of the present invention.

FIG. 4 depicts flow diagram 400, which illustrates a method for prioritizing IP traffic in wireless network 100 based on a type-of-service identifier in accordance with one embodiment of the present invention. Initially, PDSN 150 receives an IP datagram 310 destined for MS 111 (process step 405). PDSN 150 adds an IP header 330, in addition to other data fields 315, 320 and 325, to IP datagram 310 in order to form an IP message 335 (process step 410). PDSN 150 copies original TOS identifier 305*a* from IP datagram 310 into duplicate TOS identifier 305*b* of IP header 330 (process step 415). PDSN 150 then sends the completed IP message 335 to PCF unit 190 (process step 420).

PCF unit 190 receives IP message 335 from PDSN 190 (process step 425) and checks duplicate TOS identifier 305*b* in IP header 330 to determine the type of service associated with IP datagram 310 (process step 430). PCF unit 190 prioritizes IP datagram 310 based on duplicate TOS identifier 305*b* (process step 435). PCF unit 190 processes IP message 335 by removing data fields 315, 320, 325 and 330 added by PDSN 150 (process step 440) and sends IP datagram 310 to BS 101 for delivery to MS 111 in accordance with its priority (process step 445).

Although the present invention has been described with an exemplary embodiment, various changes and modifications may be suggested to one skilled in the art. It is intended that the present invention encompass such changes and modifications as fall within the scope of the appended claims.

What is claimed is:

1. A method for prioritizing IP traffic in a wireless network based on a type-of-service (TOS) identifier, the method comprising the steps of:
   receiving an IP datagram at a packet data server node, the IP datagram comprising an inner IP header that comprises an original TOS identifier in an inner TOS field;
   forming an IP message by the packet data server node by adding an outer IP header to the IP datagram, the outer IP header comprising an outer TOS field;
   determining by the packet data server node whether the original TOS identifier comprises a high priority value; and
   copying the original TOS identifier from the inner TOS field into a duplicate TOS identifier in the outer TOS field by the packet data server node only when the original TOS identifier comprises a high priority value.

2. The method as set forth in claim 1, wherein the step of forming the IP message further comprises the step of adding a point-to-point protocol header and a point-to-point protocol trailer to the IP datagram.

3. The method as set forth in claim 2, wherein the step of forming the IP message further comprises the step of adding a generic routing encapsulation header to the IP datagram.

4. The method as set forth in claim 1, wherein the original TOS identifier and the duplicate TOS identifier each comprise a plurality of bits.

5. The method as set forth in claim 1, wherein the original TOS identifier comprises a standard value for a low priority IP datagram.

6. The method as set forth in claim 1, further comprising the step of sending the IP message to a packet control function unit.

7. The method as set forth in claim 6, further comprising the step of prioritizing the IP datagram at the packet control function unit based on the duplicate TOS identifier.

8. A method for prioritizing IP traffic in a wireless network based on a type-of-service (TOS) identifier, the method comprising the steps of:
    receiving an IP message at a packet control function unit, the IP message comprising an IP datagram having an inner IP header and further comprising an outer IP header, the inner IP header comprising an original TOS identifier in an inner TOS field, the original TOS identifier associated with a priority value, the outer IP header comprising an outer TOS field, and the outer IP header comprising a duplicate TOS identifier corresponding to a high priority value in the outer TOS field that is copied from the original TOS identifier only when the original TOS identifier comprises the high priority value;
    determining by the packet control function unit whether the duplicate TOS identifier comprises a high priority value; and
    processing the IP datagram as a high priority IP datagram by the packet control function unit upon the determination that the duplicate TOS identifier comprises the high priority value.

9. The method as set forth in claim 8, further comprising the step of processing the IP message by the packet control function unit by removing a point-to-point protocol header and a point-to-point protocol trailer from the IP message.

10. The method as set forth in claim 9, further comprising the step of processing the IP message by the packet control function unit by removing a generic routing encapsulation header from the IP message.

11. The method as set forth in claim 8, wherein the original TOS identifier and the duplicate TOS identifier each comprise a plurality of bits.

12. The method as set forth in claim 8, wherein the duplicate TOS identifier comprises a standard value for a low priority IP datagram.

13. The method as set forth in claim 8, wherein the step of receiving the IP message comprises the step of receiving the IP message from a packet data server node.

14. The method as set forth in claim 8, wherein the original TOS identifier comprises a least significant bit of the inner TOS field.

15. The method as set forth in claim 14, wherein the duplicate TOS identifier comprises a least significant bit of the outer TOS field.

16. A wireless network comprising a plurality of base stations capable of communicating with a plurality of mobile stations, each of the plurality of base stations coupled to a packet data server node, wherein the packet data server node is configured to:
    i) receive an IP datagram, the IP datagram comprising an inner IP header that comprises an original type-of-service (TOS) identifier in an inner TOS field, the original TOS identifier associated with a value,
    ii) form an IP message by adding an outer IP header to the IP datagram, the outer IP header comprising an outer TOS field,
    iii) determine whether the original TOS identifier comprises a high priority value, and
    iv) copy the original TOS identifier from the inner TOS field into a duplicate TOS identifier in the outer TOS field only when the original TOS identifier comprises the high priority value.

17. The wireless network as set forth in claim 16, wherein the packet data server node is further configured to form the IP message by adding a point-to-point protocol header, a point-to-point protocol trailer, and a generic routing encapsulation header to the IP datagram.

18. The wireless network as set forth in claim 16, wherein the original TOS identifier comprises a standard value for a low priority IP datagram.

19. The wireless network as set forth in claim 16, wherein the original TOS identifier and the duplicate TOS identifier each comprise a plurality of bits.

20. The wireless network as set forth in claim 16, further comprising a packet control function unit coupled to the packet data server node, wherein the packet data server node is further configured to send the IP message to the packet control function unit and the packet control function unit is configured to prioritize the IP datagram based on the duplicate TOS identifier.

* * * * *